(12) United States Patent
Rong

(10) Patent No.: US 12,522,891 B2
(45) Date of Patent: Jan. 13, 2026

(54) METHOD OF RECYCLING A COMPONENT WITH RARE EARTH ELEMENT RECOVERY

(71) Applicant: Ford Global Technologies, LLC, Dearborn, MI (US)

(72) Inventor: Chuanbing Rong, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 674 days.

(21) Appl. No.: 17/939,543

(22) Filed: Sep. 7, 2022

(65) Prior Publication Data

US 2024/0076760 A1  Mar. 7, 2024

(51) Int. Cl.
*C22B 59/00* (2006.01)
*C22B 7/00* (2006.01)

(52) U.S. Cl.
CPC ............. *C22B 59/00* (2013.01); *C22B 7/006* (2013.01)

(58) Field of Classification Search
CPC ......... C22B 59/00; C22B 7/006; C22B 7/007; C23F 1/02; Y02P 10/20
USPC .......................................................... 75/743
See application file for complete search history.

(56) References Cited

U.S. PATENT DOCUMENTS

| | | | |
|---|---|---|---|
| 3,749,314 A * | 7/1973 | Robinson | B65G 53/30 239/206 |
| 10,648,063 B2 | 5/2020 | Mudring et al. | |
| 11,118,245 B2 | 9/2021 | Berggren et al. | |
| 11,148,957 B2 | 10/2021 | Le Breton et al. | |
| 2015/0056427 A1 * | 2/2015 | Guillemette | C23C 28/322 205/135 |
| 2018/0119251 A1 * | 5/2018 | Fox | B01D 15/08 |

FOREIGN PATENT DOCUMENTS

JP   2000324738 A   * 11/2000

OTHER PUBLICATIONS

JP 2000-324738A Translation (Year: 2000).*
Moradi et al. "Construction of highly anti-corrosion and super-hydrophobic polypropylene/graphene oxide nanocomposite coatings on carbon steel: Experimental, electrochemical and molecular dynamics study," Construction and Building Materials 317, available online Dec. 28, 2021 (Year: 2021).*

* cited by examiner

*Primary Examiner* — Danielle M. Carda
(74) *Attorney, Agent, or Firm* — Burris Law, PLLC

(57) ABSTRACT

A method of recycling a component having a base structure and at least one body coupled to the base structure, wherein the body includes a rare earth element, includes positioning a mask over the component to produce a masked component. The mask is a material that is resistant to a liquid. The liquid is an acid or solvent and configured to dissolve the rare earth element. The mask covers the base structure to inhibit exposure of the base structure to the liquid. The mask defines at least one window aligned with the at least one body to expose the body to the liquid. The method includes dissolving the rare earth element into a solution by exposing the masked component to the liquid such that the liquid contacts the at least one body through the at least one window. The method further includes recovering the rare earth element from the solution.

19 Claims, 5 Drawing Sheets

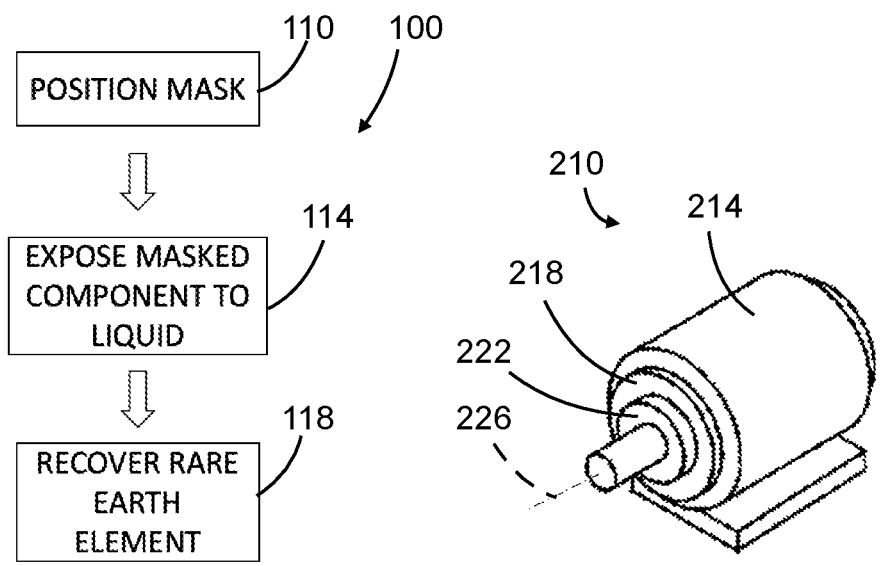
FIG. 1
FIG. 2
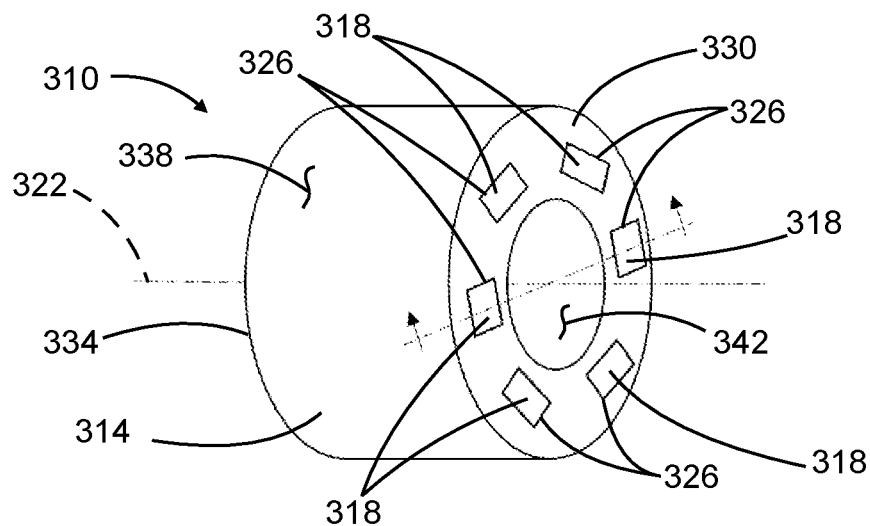
FIG. 3

METHOD OF RECYCLING A COMPONENT WITH RARE EARTH ELEMENT RECOVERY

FIELD

The present disclosure relates to a method of recycling a component with rare earth element recovery.

BACKGROUND

The statements in this section merely provide background information related to the present disclosure and may not constitute prior art.

Some components include rare earth elements, the recovery of which can be beneficial. One typical method of recycling components to recover rare earth elements includes melting the entire component. The rare earth elements are then oxidized or dissolved by an acid from the entire melted component. Next, the rare earth oxide is extracted from the solvent.

Another typical method includes physically disassembling the rare earth element containing materials from the rest of the component. The rare earth element materials are then pulverized into a powder. Next, the rare earth elements are dissolved by an acid or other solvent. Finally, the rare earth oxide is extracted from the solvent.

These typical methods can be useful for certain applications but, on some components, the rare earth elements are attached to other structures in a way that makes physical removal of the rare earth element materials difficult or labor intensive and melting the entire component can be inefficient. For example, some electric motors include rare earth element materials (e.g., rare earth element magnets) embedded in a steel structure of either a rotor or a stator of the motor. These rare earth element materials are typically very tightly pressed into the steel structure and may be adhered therein by a glue or thermoset material for example.

The present disclosure addresses these and other issues with typical recycling methods for recovering rare earth elements from components.

SUMMARY

This section provides a general summary of the disclosure and is not a comprehensive disclosure of its full scope or all of its features.

The present disclosure provides for a method of recycling a component that includes a base structure and at least one body coupled to the base structure, the at least one body including a rare earth element, includes positioning a mask over the component to produce a masked component. The mask is a material that is resistant to a liquid. The liquid is an acid or solvent and configured to dissolve the rare earth element. The mask covers the base structure to inhibit exposure of the base structure to the liquid. The mask defines at least one window aligned with the at least one body to expose the body to the liquid. The method includes dissolving the rare earth element into a solution by exposing the masked component to the liquid such that the liquid contacts the at least one body through the at least one window. The method further includes recovering the rare earth element from the solution.

In variations of the method of the above paragraph, which may be implemented individually or in any combination: the component is a rotor or a stator of an electric motor and the at least one body includes a plurality of bodies disposed about a rotational axis of the component; the base structure includes a plurality of laminated metal layers that cooperate to define a plurality of pockets, wherein each body of the plurality of bodies is a rare earth element magnet disposed within a corresponding one of the pockets; the pockets are open to an exterior of the base structure through an axial end face of the base structure; the base structure is steel; the rare earth element is praseodymium, neodymium, samarium, terbium, dysprosium, holmium, lanthanum, or cerium; the liquid has a pH that is less than or equal to 6; the pH of the liquid is greater than or equal to 3; the liquid comprises at least one of 0.1 M hydrochloric acid, 15 M nitric acid, 0.1 M to 1.0 M oxalic acid, and Di-(2-ethylhexyl) phosphoric acid; the mask comprises at least one of Polytetrafluoroethylene, Polyvinyl chloride, and Polypropylene; exposing the masked component includes submerging at least a portion of the masked component in bath of the liquid; exposing the masked component includes directing at least one jet of the liquid toward the at least one window to directly impinge on the at least one body; the at least one jet is submerged in the bath; exposing the masked component includes directing at least one jet of the liquid toward the at least one window to directly impinge on the at least one body; recovering the rare earth element from the solution includes performing a reduction process.

In another form, the present disclosure provides for a method of recycling a component that includes a base structure and at least one body coupled to the base structure, the at least one body including a rare earth element, the method including positioning a mask over the component to produce a masked component. The mask is a material that is resistant to a liquid, the liquid being an acid or solvent and configured to dissolve the rare earth element. The mask covers the base structure to inhibit exposure of the base structure to the liquid. The mask defines at least one window aligned with the at least one body to expose the body to the liquid. The method includes dissolving the rare earth element into a solution by directing at least one jet of the liquid toward the at least one window to directly impinge on the at least one body through the at least one window. The method further includes recovering the rare earth element from the solution.

In variations of the method of the above paragraph, which may be implemented individually or in any combination: the at least one jet is submerged in a bath of the liquid; the component is a rotor or a stator of an electric motor and the at least one body includes a plurality of bodies disposed about a rotational axis of the component.

In still another form, the present disclosure provides a method of recycling a component that includes a base structure and at least one body coupled to the base structure, the at least one body comprising a rare earth element, the method including positioning a mask over the component to produce a masked component. The mask is a material that is resistant to a liquid, the liquid being an acid or solvent and configured to dissolve the rare earth element. The mask covers the base structure to inhibit exposure of the base structure to the liquid. The mask defines at least one window aligned with the at least one body to expose the body to the liquid. The method includes dissolving the rare earth element into a solution by exposing the masked component to the liquid such that the liquid contacts the at least one body through the at least one window. The method further includes recovering the rare earth element from the solution. Furthermore, the component is a rotor or a stator of an electric motor and the at least one body includes a plurality of bodies disposed about a rotational axis of the component. Additionally, the base structure includes a plurality of laminated metal layers that cooperate to define a plurality of pockets and each body of the plurality of bodies is a rare earth element magnet disposed within a corresponding one of the pockets.

In a variation of the method of the above paragraph, exposing the masked component includes directing at least one jet of the liquid toward the at least one window to directly impinge on the at least one body.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 1 is a flow chart of a method of recycling a component contain rare earth elements according to the present disclosure;

FIG. 2 is a perspective view of an example device containing rare earth element materials to be recycled by the method of FIG. 1;

FIG. 3 is a perspective view of a component of the example device of FIG. 2;

Figure 6:
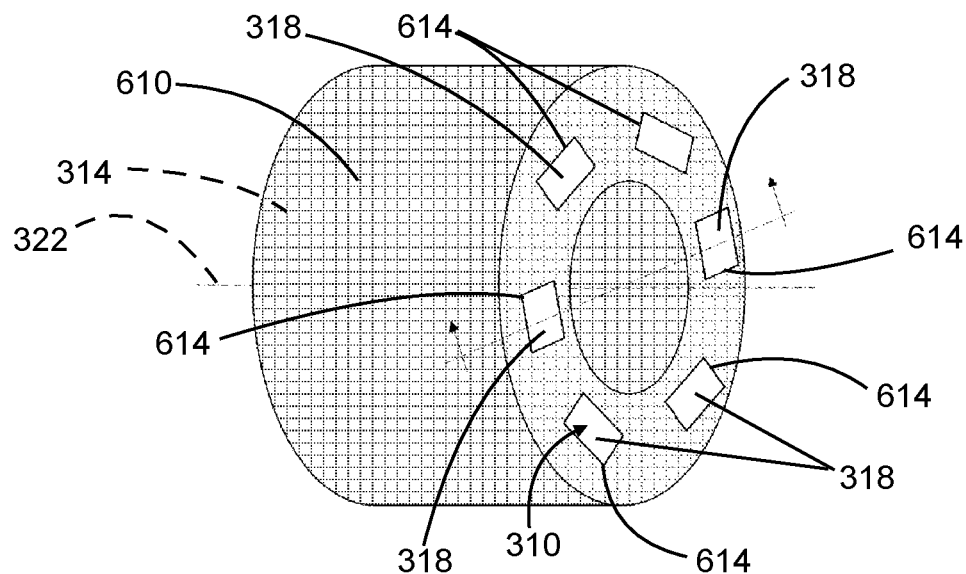
FIG. 6 is a perspective view of the component of FIG. 3 but covered by a mask in accordance with the method of FIG. 1.
Figure 9:
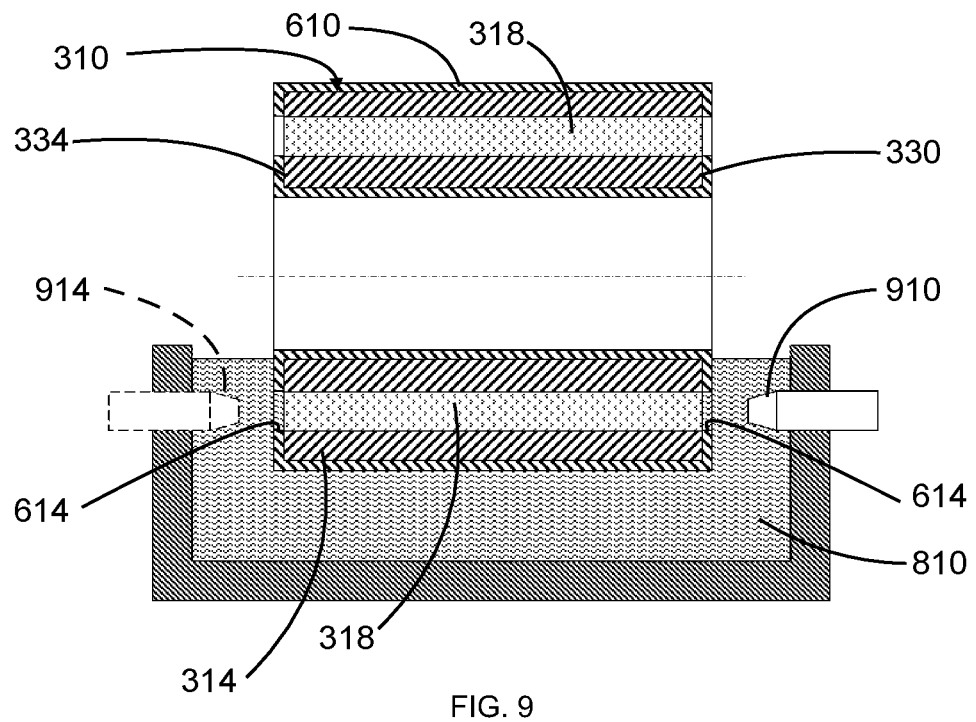
Figure 10:
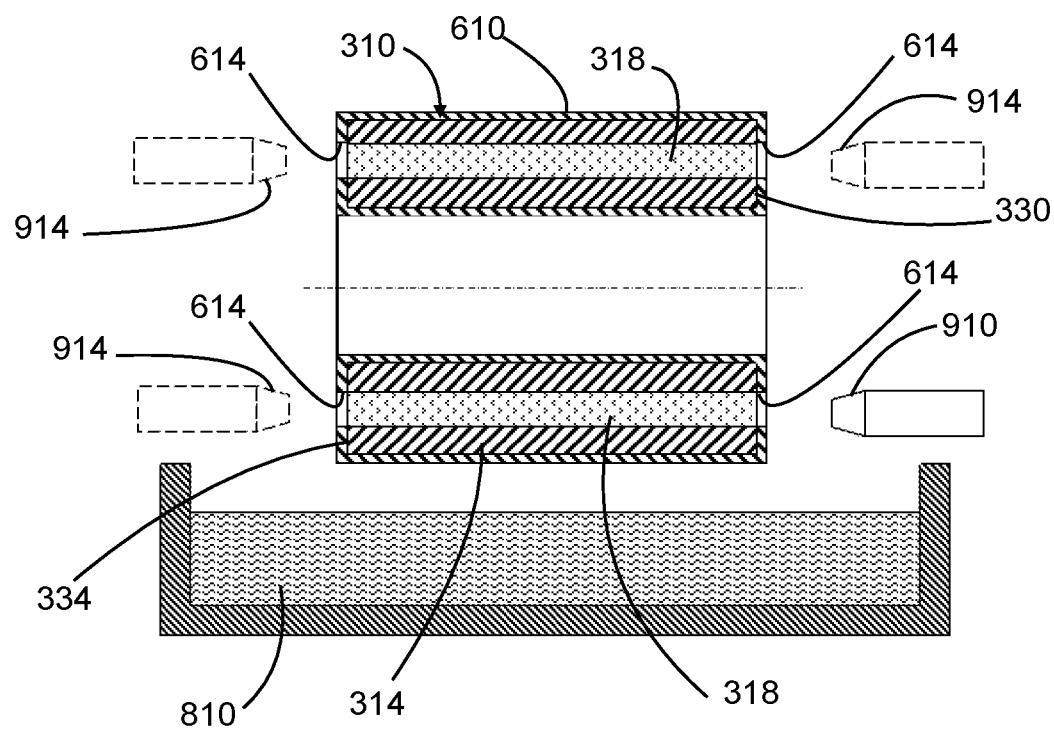

FIG. 9 is a cross-sectional view of the covered component of FIG. 6, partially submerged in a bath of a liquid in which one or more jets are directed toward windows of the mask, in accordance with the method of FIG. 1; and FIG. 10 is a cross-sectional view of the covered component of FIG. 6, disposed above a catch basin configured to catch liquid from one or more jets directed toward windows of the mask, in accordance with the method of FIG. 1.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Referring to FIG. 1, a method 100 of recycling a component that includes rare earth element is illustrated in flow chart form. At step 110, a mask is positioned to cover a base structure of the component to produce a masked component. The mask is a material that is resistant to a liquid acid or solvent that is configured to dissolve the rare earth element. The mask covers the base structure to inhibit exposure of the base structure to the liquid and defines at least one window. Every window is aligned with a corresponding body that includes the rare earth element to expose the body to the liquid.

At step 114, the masked component is exposed to the liquid until the rare earth element is dissolved into a solution.

At step 118, the rare earth element is recovered from the solution. The recovery can be done by any suitable recovery process, such as a reduction process for example.

Referring to FIG. 2, an example of a device 210 that includes a component to be recycled containing a rare earth element to be recovered is schematically illustrated. In the example provided, the device 210 is an electric motor including a housing 214, a stator 218, and a rotor 222 supported for rotation about a central axis 226.

Referring to FIG. 3, an example component 310 that contains a rare earth element to be recovered using the method 100 (FIG. 1) is schematically illustrated. The component 310 includes a base structure 314 and one or more bodies 318 attached to the base structure 314. In the example provided, the component 310 is a stator (e.g., stator 218 of FIG. 2) or a rotor (e.g., rotor 222 of FIG. 2) of an electric motor (e.g., device 210 of FIG. 2), though other types of components in which a body containing a rare earth element is attached to a base structure can be used.

The base structure 314 is a material that is substantially not a rare earth element material. The bodies 318 contain one or more rare earth elements to be recovered. The rare earth elements contained may be one or more of the following and/or oxides thereof: scandium, yttrium, lanthanum, cerium, praseodymium, neodymium, promethium, samarium, europium, gadolinium, terbium, dysprosium, holmium, erbium, thulium, ytterbium, and lutetium.

In the example provided, the base structure 314 is a metal (e.g., steel), though other materials can be used. In the example provided, the bodies 318 are permanent magnets containing a rare earth element such as praseodymium, neodymium, samarium, terbium, dysprosium, holmium, lanthanum, and/or cerium, though other materials can be used.

Figure 4:
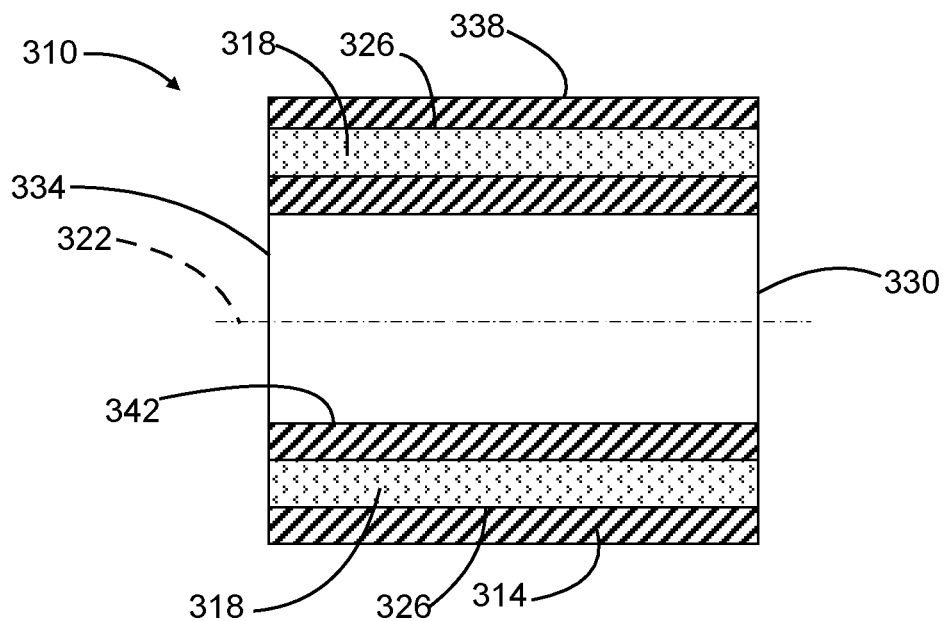
FIG. 4 is a cross-sectional view of the component of FIG. 3.

Referring to FIGS. 3 and 4, in the example provided, the base structure 314 is a generally cylindrical shape disposed about a rotational axis 322 (e.g., central axis 226 of FIG. 2). The base structure 314 defines a plurality of cavities or pockets 326 open to the exterior of the base structure 314. Each body 318 is disposed within a corresponding one of the pockets 326. In the example provided, the pockets 326 extend longitudinally parallel to the axis 322 and are open through both axial ends 330, 334 of the base structure 314, though other configurations can be used such as being open through a radially outermost surface 338 and/or a radially innermost surface 342 of the base structure 314 for example.

Figure 5:
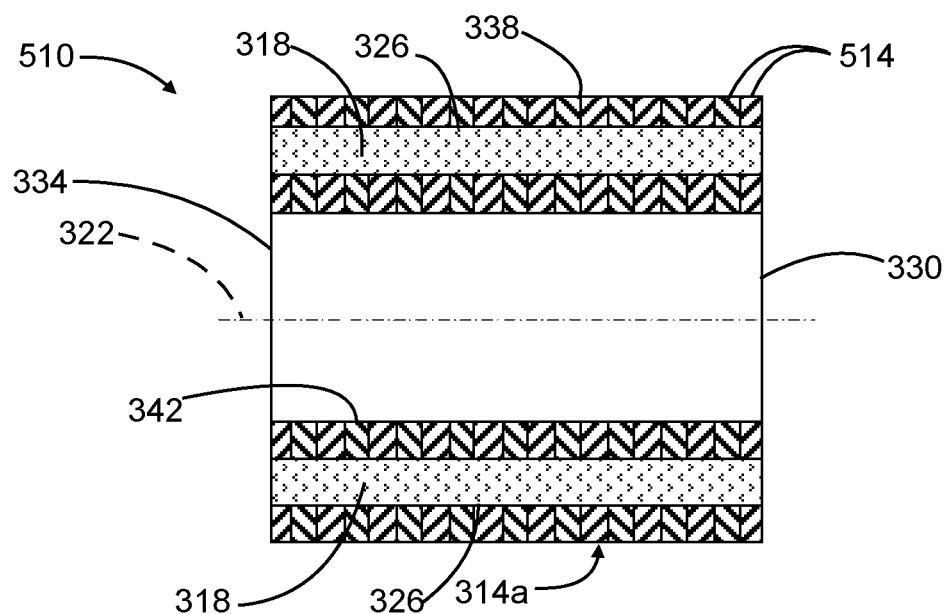
FIG. 5 is a cross-sectional similar to FIG. 4 but illustrating a component of a second construction.

Referring to FIG. 5, a component 510 of an alternative construction is illustrated. The component 510 is similar to the component 310, except as otherwise shown or described herein. Accordingly, similar features are identified with similar reference numerals and only differences are described in detail herein. Specifically, the base structure 314a is similar to the base structure 314 (FIGS. 3 and 4) except that it is made up of a plurality of a plurality of laminated slices or layers 514 (only two of which are specifically labeled for ease of illustration) that are stacked end-to-end along the axis 322. The layers 514 may be connected to each other by any suitable method such as via adhesive, welding, or fasteners for example. Similar to the base structure 314 (FIGS. 3 and 4), the layers 514 may be metal (e.g., steel).

Figure 7:
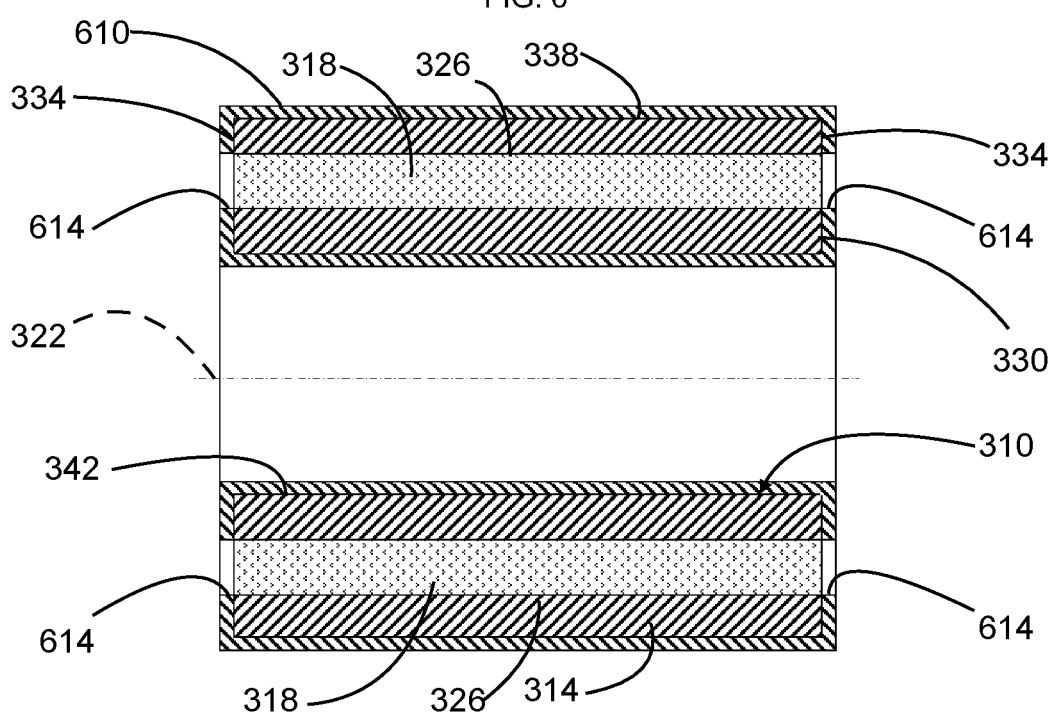
FIG. 7 is a cross-sectional view of the covered component of FIG. 6.

Returning to the method 100 of FIG. 1, with additional reference to FIGS. 6 and 7, the component 310 a mask 610 (schematically indicated in FIG. 6 using a grid pattern that is meant to be a visual indication of the presence of the mask for clarity of the drawing and is not intended to indicate a specific surface texture or structure of the mask) is positioned over the component 310 at step 110. The mask 610 is made of a material that is resistant to a predetermined liquid that is an acid or other solvent configured to dissolve the rare earth element from the bodies 318. Some example materials for the mask 610 include Polytetrafluoroethylene, Polyvinyl chloride, and Polypropylene, though other materials may be used.

Some example liquids for use include liquids with a pH of less than or equal to 6. In one form, the liquid may have a pH less than or equal to 6 and greater than or equal to 3. In another form, the liquid may have a pH less than or equal to 6 and greater than or equal to 4. Some example acids for the liquid include 0.1 M hydrochloric acid, 15 M nitric acid, 0.1 M to 1.0 M oxalic acid, and Di-(2-ethylhexyl) phosphoric acid, though other acids may be used. In another form, other non-acid solvents may be used.

The mask 610 covers the base structure 314 but defines one or more cut-outs or windows 614 open through the mask 610. The windows 614 align with corresponding openings of the pockets 326. In other words, the mask 610 is in contact with the base structure 314 to inhibit the liquid from contacting the base structure 314 while the windows 614 permit the liquid to contact the bodies 318.

In the example provided, the mask 610 covers both axial ends 330, 334, the radially outermost surface 338 and the radially innermost surface 342, and the windows 614 are disposed at the locations on the axial ends 330, 334 where the pockets 326 are open to the bodies 318. In one alternative form, not specifically shown, the pockets 326 may be open only through one axial end 330 or 334 or some may be open through one axial end 330 or 334 while others are open through the other axial end 330, 334.

The mask 610 can be permanently or temporarily adhered to the base structure 314 with an adhesive (not specifically shown), though other configurations can be used. In one alternative form, the mask 610 is a coating that is applied to the base structure 314, such as with a brush or sprayer for example. In another alternative form, the mask 610 may be heat-shrunk onto the base structure 314. In yet another alternative form, the mask 610 may be a resilient (i.e., stretchy) material having a natural shape smaller than the base structure 314 such that the mask's 610 resilience biases it into contact with the base structure 314.

Figure 8:
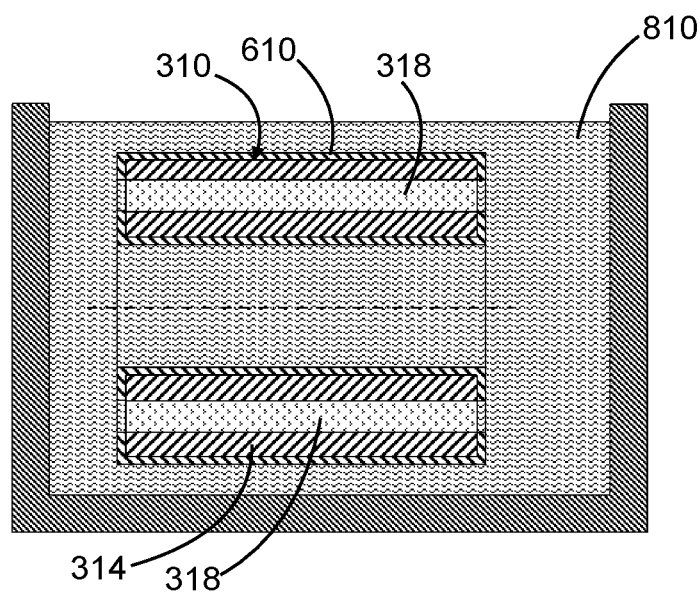
FIG. 8 is a cross-sectional view of the covered component of FIG. 6 submerged in a bath of a liquid in accordance with the method of FIG. 1.

Referring back to step 114 of FIG. 1, the component 310 with the mask 610 applied (i.e., the masked component) is exposed to the liquid (indicated by reference numeral 810 in FIGS. 8-10). The masked component 310 with 610 may be exposed to the liquid 810 (FIGS. 8-10) in any suitable manner.

In the example of step 114 shown in FIG. 8, the masked component 310 with 610 is fully submerged in a bath of the liquid 810. As such, the mask inhibits the liquid 810 from contacting the base structure 314, while permitting the liquid 810 to dissolve the bodies 318. The liquid 810 in the bath can be optionally circulated. The masked component 310 with 610 can be optionally rotated in the bath and/or vibrated in the bath. In one alternative form, the masked component 310 with 610 can be partially submerged and may optionally be rotated in the bath so to expose different parts of the masked component 310 with 610.

In the example of step 114 shown in FIG. 9, the masked component 310 with 610 is partially submerged in a bath of the liquid 810 and at least one nozzle 910 is aligned with a corresponding window 614 below the surface of the liquid 810 and directs a jet of liquid 810 directly through the window 614 to impinge on the body 318 below the surface of the liquid 810. As shown in dashed lines, one or more nozzles 914 may optionally be aligned with a corresponding window 614 below the surface on the opposite axial end 330, 334 from the nozzle 910. While only one nozzle 910 and 914 is illustrated as being directed toward a corresponding submerged window 614 on each axial end 330, 334 of the masked component 310 with 610, more than one nozzle can optionally be directed toward a single corresponding window 614.

In one form, the masked component 310 with 610 is rotated through the bath to position the next window 614 in alignment with the nozzle 910, 914. While only one window 614 on each axial end 330, 334 is visible in FIG. 9, more than one window 614 can optionally be submerged and corresponding nozzles (similar to nozzles 910, 914) can be directed toward those submerged windows 614.

In the example of step 114 shown in FIG. 10, the masked component 310 with 610 is not submerged in a bath of the liquid 810 and is disposed above a catch device (e.g., a catch basin) for catching the liquid 810 while at least one nozzle 910 is aligned with a corresponding window 614 and directs a jet of liquid 810 directly through the window 614 to impinge on the body 318. As shown in dashed lines, one or more nozzles 914 may optionally be aligned with a corresponding window 614 on the same axial end 330, 334 as the nozzle 910 and/or the opposite axial end 330, 334 from the nozzle 910. While only one nozzle 910 and 914 is illustrated as being directed toward a corresponding window 614 on each axial end 330, 334 of the masked component 310 with 610, more than one nozzle can optionally be directed toward a single corresponding window 614.

In one form, every window 614 has a corresponding nozzle 910, 914. In another form, fewer nozzles 910, 914 than windows 614 are used and the masked component 310 with 610 is rotated to position the next window 614 in alignment with a corresponding one of the nozzles 910, 914. In still another form, some of the windows 614 and nozzles 910, 914 may be submerged a bath of the liquid 810 while others of the windows 614 and nozzles 910, 914 may be above the surface of the liquid 810.

In one form, not specifically shown, in which the masked component 310 is either not fully submerged or not partially submerged, the mask 610 can be disposed only on the axial ends 330, 334 and not on the radially outermost surface 338 (labeled in FIG. 5) and/or not on the radially innermost surface 342 (labeled in FIG. 5). In another form, not specifically shown, in which the masked component 310 is partially submerged but such that the radially innermost surface 342 (labeled in FIG. 5) is above the surface of the liquid 810, the mask 610 can be disposed on the axial ends 330, 334 and the radially outermost surface 338 (labeled in FIG. 5) but not on the radially innermost surface 342 (labeled in FIG. 5).

During step 114, the exposure to the liquid 810 may continue until all the bodies 318 are dissolved from the base structure 314. In one form, the liquid 810 may be configured to not be strong enough to significantly dissolve the material of the base structure 314. In another form, the liquid 810 may be strong enough to dissolve the base structure 314. In such a configuration, some of the base structure 314 may be dissolved, particularly since the base structure 314 will become exposed within the pockets 326 as the bodies 318 dissolve away. However, the mask 610 significantly reduces the surface area of the base structure 314 that is exposed to the liquid 810 and the time in which it is exposed. Thus, the mask 610 significantly reduces the amount of base structure 314 that is dissolved. As such, the ratio of dissolved rare earth element to the dissolved material of the base structure 314 is significantly improved such that efficiency of the recovery step 118 is increased over typical recycling processes.

During step 118, the liquid 810 with the dissolved rare earth elements is processed to recover the rare earth elements therefrom for future use. The recovery process can be any suitable known process for recovering rare earth elements from a solvent or acid, such as a reduction process for example. Such recovery processes are well known to those of skill in the art and need not be described in detail herein.

Accordingly, the present disclosure provides a method that improves rare earth element recovery efficiency over typical recycling methods.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method of recycling a component that includes a base structure and at least one body coupled to the base structure, the at least one body comprising a rare earth element, the method comprising:
    positioning a mask over the component to produce a masked component, the mask being a material that is resistant to a liquid, the liquid being an acid or solvent and configured to dissolve the rare earth element, wherein the mask covers the base structure to inhibit exposure of the base structure to the liquid, wherein the mask defines at least one window aligned with the at least one body to expose the body to the liquid;
    dissolving the rare earth element into a solution by exposing the masked component to the liquid such that the liquid contacts the at least one body through the at least one window; and
    recovering the rare earth element from the solution,
    wherein the mask comprises at least one of Polytetrafluoroethylene, Polyvinyl chloride, and Polypropylene.

2. The method according to claim 1, wherein the component is a rotor or a stator of an electric motor and the at least one body includes a plurality of bodies disposed about a rotational axis of the component.

3. The method according to claim 2, wherein the base structure includes a plurality of laminated metal layers that cooperate to define a plurality of pockets, wherein each body of the plurality of bodies is a rare earth element magnet disposed within a corresponding one of the pockets.

4. The method according to claim 3, wherein the pockets are open to an exterior of the base structure through an axial end face of the base structure.

5. The method according to claim 1, wherein the base structure is steel.

6. The method according to claim 1, wherein the rare earth element is praseodymium, neodymium, samarium, terbium, dysprosium, holmium, lanthanum, or cerium.

7. The method according to claim 1, wherein the liquid has a pH that is less than or equal to 6.

8. The method according to claim 7, wherein the pH of the liquid is greater than or equal to 3.

9. The method according to claim 1, wherein the liquid comprises at least one of 0.1 M hydrochloric acid, 15 M nitric acid, 0.1 M to 1.0 M oxalic acid, and Di-(2-ethylhexyl) phosphoric acid.

10. The method according to claim 1, wherein exposing the masked component includes submerging at least a portion of the masked component in bath of the liquid.

11. The method according to claim 10, wherein exposing the masked component includes directing at least one jet of the liquid toward the at least one window to directly impinge on the at least one body.

12. The method according to claim 11, wherein the at least one jet is submerged in the bath.

13. The method according to claim 1, wherein exposing the masked component includes directing at least one jet of the liquid toward the at least one window to directly impinge on the at least one body.

14. The method according to claim 1, wherein recovering the rare earth element from the solution includes performing a reduction process.

15. A method of recycling a component that includes a base structure and at least one body coupled to the base structure, the at least one body comprising a rare earth element, the method comprising:
    positioning a mask over the component to produce a masked component, the mask being a material that is resistant to a liquid, the liquid being an acid or solvent and configured to dissolve the rare earth element, wherein the mask covers the base structure to inhibit exposure of the base structure to the liquid, wherein the mask defines at least one window aligned with the at least one body to expose the body to the liquid;
    dissolving the rare earth element into a solution by directing at least one jet of the liquid toward the at least one window to directly impinge on the at least one body through the at least one window; and
    recovering the rare earth element from the solution,
    wherein the mask comprises at least one of Polytetrafluoroethylene, Polyvinyl chloride, and Polypropylene.

16. The method according to claim 15, wherein the at least one jet is submerged in a bath of the liquid.

17. The method according to claim 15, wherein the component is a rotor or a stator of an electric motor and the at least one body includes a plurality of bodies disposed about a rotational axis of the component.

18. A method of recycling a component that includes a base structure and at least one body coupled to the base structure, the at least one body comprising a rare earth element, the method comprising:
    positioning a mask over the component to produce a masked component, the mask being a material that is resistant to a liquid, the liquid being an acid or solvent and configured to dissolve the rare earth element, wherein the mask covers the base structure to inhibit exposure of the base structure to the liquid, wherein the mask defines at least one window aligned with the at least one body to expose the body to the liquid;

dissolving the rare earth element into a solution by exposing the masked component to the liquid such that the liquid contacts the at least one body through the at least one window; and recovering the rare earth element from the solution, wherein the component is a rotor or a stator of an electric motor and the at least one body includes a plurality of bodies disposed about a rotational axis of the component, wherein the base structure includes a plurality of laminated metal layers that cooperate to define a plurality of pockets, wherein each body of the plurality of bodies is a rare earth element magnet disposed within a corresponding one of the pockets, and wherein the mask comprises at least one of Polytetrafluoroethylene, Polyvinyl chloride, and Polypropylene.

19. The method according to claim 18, wherein exposing the masked component includes directing at least one jet of the liquid toward the at least one window to directly impinge on the at least one body.

* * * * *